Patented Oct. 18, 1932

1,882,984

UNITED STATES PATENT OFFICE

KARL SCHRANZ AND SIEGFRIED JAEGER, OF ELBERFELD, GERMANY, ASSIGNORS TO WINTHROP CHEMICAL COMPANY, INC., OF NEW YORK, N. Y., A CORPORATION OF NEW YORK

RECTAL ANÆSTHETIC

No Drawing. Application filed December 7, 1928, Serial No. 324,577, and in Germany December 16, 1927.

The present invention relates to a new composition of matter consisting of tribromoethylalcohol and a liquid non-primary i. e. secondary or tertiary aliphatic alcohol.

When using tribromoethylalcohol as a rectal anæsthetic or narcotic an exact dosing of the same will be of great importance. It will be useful for this purpose to have the tribromoethylalcohol in a liquid form, for instance dissolved in a suitable organic solvent. This is, however, met by the difficulty, that tribromoethylalcohol dissolved in an organic solvent which is usually applied for medical purposes, such as ethyl alcohol, glycerine, glycol and the like, quickly decomposes under the influence of light or elevated temperatures. For instance, a solution of 2 grams of tribromoethylalcohol in 6 cc. of ethylalcohol partially decomposes when exposed to day-light at normal temperature within one day, hydrobromic acid being split off in a quantity corresponding to about 1 cc. $\frac{1}{10}$ n AgNO$_3$ solution, which quantity increases after about 56 days to an amount corresponding to about 20 cc. $\frac{1}{10}$ n AgNO$_3$ solution.

In accordance with the present invention the addition to tribromo-ethyl alcohol of a liquid non-primary i. e. secondary or tertiary aliphatic alcohol such as amylene-hydrate, diethylmethlcarbinol, trimethylcarbinol, isopropyl alcohol and the like, yields a liquified product, being stable to light and to elevated temperatures, decomposition not occurring even at about 100° C. Furthermore, by a suitable selection of the alcohol to be added, it will be possible to influence the pharmacological action of the liquified tribromoethyl alcohol in various manners. The secondary alcohols, for instance, are pharmacologically more indifferent than the tertiary alcohols, the latter also varying among themselves in their action.

The amount of alcohol to be added may vary in wide limits, but is advantageously chosen in such a manner that the mixture is liquid at normal temperature and furthermore exerts the desired pharmacological action. In the most cases amounts of about 15–100% of an alcohol of the kind above referred to (calculated on the amount of tribromoethylalcohol) will be suitable, but it may be mentioned that also larger or smaller quantities may in some cases yield better results and are within the scope of our invention.

The following examples illustrate our invention without limiting it thereto, the parts being by weight:

*Example 1.*—100 parts of tribromoethylalcohol are introduced in 50 parts of amylene hydrate while stirring, at room temperature. The mixture soon liquefies, the liquid being stable to light and heating; three parts of the mixture dissolved at about 40° C. in 100 cc. of water will yield a clear solution suitable for rectal anæsthetic or narcotic purposes.

*Example 2.*—100 parts of tribromoethylalcohol are mixed with 15 parts of isopropylalcohol in the same way as described in Example 1. The liquid thus obtainable does not solidify at about 0° C., and when mixed with water yields a clear solution of valuable anæsthetic and narcotic properties.

Similar results will be obtained by replacing the isopropylalcohol by other liquid secondary or tertiary alcohols such as 45 parts of diethylmethylcarbinol, 30 parts of trimethylcarbinol or the like.

We claim:

1. A composition of matter comprising tribromoethylalcohol and such a quantity of a liquid nonprimary aliphatic alcohol, that the mixture is liquid at normal temperature, said composition of matter being stable to light and heating and exerting valuable pharmacological properties in the use as rectal anæsthetic or narcotic.

2. A composition of matter consisting of tribromoethylalcohol and such a quantity of a compound of the group consisting of amylene hydrate, diethylmethyl-carbinol and trimethylcarbinol, that the mixture is liquid at normal temperature, said composition of matter being stable to light and heating and exerting valuable pharmacological properties in the use as rectal anæsthetic or narcotic.

3. A composition of matter consisting of tribromoethylalcohol and a compound of the group consisting of amylene hydrate, diethylmethylcarbinol and trimethylcarbinol, in a quantity of about 15–100%, calculated on the amount of tribromoethylalcohol, said composition of matter being stable to light and heating and exerting valuable pharmacological properties in the use as rectal anæsthetic or narcotic.

4. A composition of matter consisting of 100 parts by weight of tribromoethylalcohol and 50 parts by weight of amylene hydrate, said composition of matter being stable to light and heating and exerting valuable pharmacological properties in the use as rectal anæsthetic or narcotic.

5. A composition of matter consisting of tribromoethylalcohol and such a quantity of isopropylalcohol that the mixture is liquid at normal temperature, said composition of matter being stable to light and heating and exerting valuable pharmacological properties in the use as rectal anæsthetic or narcotic.

6. A composition of matter consisting of tribromoethylalcohol and isopropylalcohol in a quantity of about 15–100%, calculated on the amount of tribromoethylalcohol, said composition of matter being stable to light and heating and exerting valuable pharmacological properties in the use as rectal anæsthetic or narcotic.

In testimony whereof we have hereunto set our hands.

KARL SCHRANZ.
SIEGFRIED JAEGER.